United States Patent Office 3,108,153
Patented Oct. 22, 1963

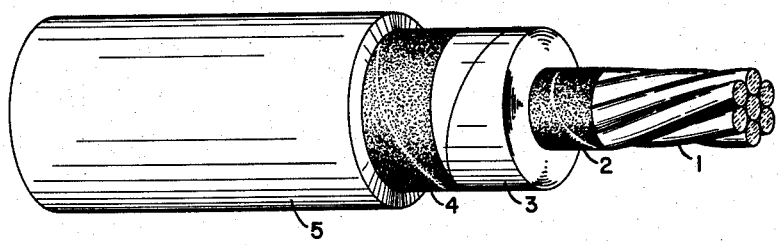
INVENTORS
GEORGE FEICK III
WALTER F. OLDS

3,108,153
HIGH VOLTAGE ELECTRICAL INSULATION INCLUDING GASSING INHIBITOR
George Feick III, Needham, and Walter F. Olds, Arlington, Mass., assignors, by mesne assignments, to Anaconda Wire and Cable Company, Hastings on Hudson, N.Y., a corporation of Delaware
Filed Aug. 21, 1959, Ser. No. 835,200
8 Claims. (Cl. 174—25)

This invention relates to high voltage electrical apparatus and, more particularly, to high voltage electric power cables having a copper conductor surrounded by insulation which is impregnated with a fluid organosilicon polymer dielectric. The invention provides an improved silicone-impregnated electric power cable and is based on the discovery that certain aromatic compounds, when incorporated in the fluid organosition polymer dielectric, are capable of imparting a negative gassing coefficient to the fluid dielectric under conditions which normally result in chemical decomposition and impaired dielectric properties. The electric power cable of the invention may be operated at high voltages and over sustained periods of time without danger of oxidative degradation to the silicon fluid or appreciable loss of its dielectric properties.

The formation and evolution of gaseous hydrogen and the oxidative degradation which occur in fluid organosilicon polymers become increasingly serious as the operating voltage of oil-insulated electrical equipment, such as oil-impregnated power cables, is increased. Progressive deterioration of organosilicon cable fluids at high voltages acts to depreciate their insulating properties since the oxidative degradation of the fluid and the formation and evolution of gaseous hydrogen are frequently, if not invariably, accompanied by a loss in dielectric strength of the cable.

The formation and evolution of gaseous hydrogen in a fluid organosilicon polymer is believed to be caused by the homolytic scission of the C—H bonds in the silicone molecules under conditions of high electrical stress, thereby generating monatomic hydrogen free radicals which combine to form vacuoles or pockets of gaseous (diatomic) hydrogen with the liberation of considerable thermal energy. At the high field intensities which occur in high voltage cables, gas in these vacuoles becomes ionized, increasing the electrical stress in the adjacent dielectric and so promoting their own enlargement or the development of more similar vacuoles along a path through which a complete breakdown of the cable insulation may occur. Certain cable oils, notably those which contain a high degree of aromaticity or olefinic unsaturation, are capable of absorbing rather than evolving the gaseous products formed under high electrical stress, probably due to the reactivity of the unsaturated loci in these oils with hydrogen or hydrogen radicals. Whether or not a fluid organosilicon polymer evolves or absorbs gas is dependent upon its gassing coefficient, which is defined as the cubic centimeters of gas evolved (+) or absorbed (—) by the oil per hundred minutes at a temperature of 82.5° C. in a test cell containing an atmosphere of hydrogen gas, using an applied voltage of 9 kilovolts at 60 cycles per second. Silicone cable fluids which evolve gaseous hydrogen under conditions of high electrical stress have a positive gassing coefficient, while those which absorb gas under the same conditions have a negative gassing coefficient as a property of state.

Using a dimethylpolysiloxane fluid dielectric in which the C—H bonds are very susceptible to homolytic scission and which has a pronounced tendency to discharge gaseous hydrogen under conditions of high electrical stress, we have discovered that by incorporating in such fluid dielectric a small amount of a phenyl-substituted polysiloxane it is possible to impart a negative gassing coefficient to the oil and to minimize any increase in the power factor of the oil when the oil is subjected to limited oxidation in the presence of copper. We have also found that the gassing coefficient of the silicone fluids changes from a positive to a negative number by dissolving in the fluid a relatively small amount either of a sec-alkyl-substituted aromatic compound having a boiling point, at atmospheric pressure, of not less than 200° C., or of a ring-substituted aromatic compound having a structure represented by the formula

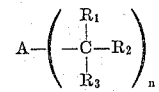

in which A is an aromatic nucleus, $R_1$, $R_2$, and $R_3$ are substituents selected from the group consisting of alkyl, cycloalkyl, and aryl radicals, and $n$ is an integer from 1 to 6, or even higher in the case of polycyclic aromatic compounds. Electrical equipment, such as power cables or transformers, in which the insulation is impregnated with a fluid organosilicon polymer containing one or more of these gassing inhibitors may be operated at very high voltages without danger of early deterioration of its dielectric properties.

Based on these discoveries, the present invention provides an improved high voltage electric power cable in which a copper conductor is surrounded by insulation impregnated with a dimethylpolysiloxane fluid in which there is dissolved a minor amount of a gassing inhibitor of the group consisting of (a) phenyl-substituted polysiloxanes, (b) sec-alkyl-substituted aromatic compounds having a boiling point, at atmospheric pressure, of not less than 200° C., and (c) ring-substituted aromatic compounds having a structure represented by the formula

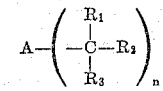

in which A is an aromatic nucleus, $R_1$, $R_2$, and $R_3$ are substituents selected from the group consisting of alkyl, cycloalkyl, and aryl radicals, and $n$ is an integer from 1 to 6, thereby imparting a negative gassing coefficient to the fluid.

Power cables fabricated in accordance with the invention may be of any of the usual types, including the solid type, the fluid-filled type, the gas-filled type, and the gas-pressure type. In the solid type, many fluid-permeable layers of a thin polyethylene tape are helically wrapped about the conductor and the taped cable thereafter is impregnated with a dimethylpolysiloxane or other fluid organosilicon polymer dielectric containing the gassing inhibitor so that the dielectric fluid fills all of the pores and interstices of the polyethylene wrapping. The resultant fluid-impregnated insulation is then encased in a lead sheath. In the fluid-filled type of cable, channels inside the cable sheath are filled with the silicone fluid and kept full by connection to a reservoir maintained under pressure. In the gas-filled type of cable, the insulation is impregnated with the silicone fluid, and after draining out excess fluid, dry inert gas, which is maintained under pressure, is introduced into the sheathed cable. In a gas-pressure cable, a tightly sheathed fluid-insulated cable is placed in a pressure-tight housing and subjected to inert gas at quite high pressure.

Various types of fluid organosilicon polymer dielectrics may be used in the high voltage power cables of the invention. Particularly satisfactory results have been obtained, however, by using those polysiloxanes, polysilanols, and polysilicate esters in which the ratio of silicon and oxygen to the hydrocarbon moiety is such that the polymers have virtually no solvating effect on the cable insulation. Of these silicone polymers, the dimethylpolysiloxane fluids in particular may be singled out for special mention since their dielectric constants are often so nearly identical to the dielectric constants of the low molecular weight polyethylenes from which insulating tapes are generally formed that it is possible to obtain a dimethylpolysiloxane - impregnated polyethylene insulation which is considerably more electrically homogeneous than polyethylene insulation impregnated with other fluid dielectrics. These dimethylpolysiloxane fluids usually possess a viscosity, at 25° C., between 0.6 and 30,000 centistokes, and a dielectric constant from about 2.2 to about 2.8, both the viscosity and the dielectric constant of the polymer generally increasing with an increase in its molecular weight.

In all, three classes of aromatic gassing inhibitors have been successfully employed in organosilicon polymer cable fluids in accordance with the invention. These include polysiloxanes containing one or more phenyl or other aromatic substituents, sec-alkyl-substituted aromatic compounds having a boiling point, at atmospheric pressure, of not less than 200° C., as well as various ring-substituted aromatic compounds containing one or more tertiary substituents. In the case of the phenyl-substituted polysiloxanes, particularly satisfactory results have been obtained by using phenylmethylpolysiloxanes which are structurally related to the dimethylpolysiloxanes, except that the methyl groups are replaced in part by phenyl groups. These phenylmethylpolysiloxanes are manufactured by the Dow-Corning Company and differ essentially from each other only in molecular weight, viscosity, and number of phenyl groups in the polymer chain.

In addition to these phenylmethylpolysiloxanes, any sec-alkyl-substituted aromatic compound having a boiling point, at atmospheric pressure, of not less than 200° C., or any ring-substituted aromatic compound having a structure represented by the formula

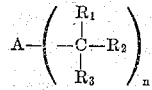

in which A is an aromatic nucleus (such as benzene, naphthalene, or anthracene), $R_1$, $R_2$, and $R_3$ are substituents selected from the group consisting of alkyl, cycloalkyl, and aryl radicals, and $n$ is an integer from 1 to 6 which represents the number of tertiary substituents in the ring, may be selected for inclusion in the cable insulation, provided the additive is capable of imparting a negative gassing coefficient to the organosilicon polymer cable fluids. We have obtained particularly satisfactory results, however, by using such sec-alkyl-substituted aromatic compounds as the diisopropylbenzenes, triisopropylbenzenes, or tetraisopropylbenzenes, or by using cycloalkyl-substituted aromatic compounds, such as phenylcyclohexane or β-(cyclohexyl)naphthalene, all of which impart a relatively high negative gassing coefficient to dimethylpolysiloxane fluids and yet are, in themselves, resistant to oxidation in the presence of copper. Included among the ring-substituted aromatic compounds which contain one or more tertiary substituents and which can be used as gassing inhibitors in accordance with the invention are those compounds in which the aromatic nucleus is either benzene, naphthalene, or anthracene, the most effective additives being the t-butyl-substituted aromatic compounds, such as the di-(t-butyl)benzenes, t-butylnaphthalenes, and t-butylanthracenes, all of which have also been found to impart a relatively high negative gassing coefficient to dimethylpolysiloxane fluids and to resist oxidative degradation in the presence of copper. Table I lists a number of sec-alkyl-substituted and tertiary-substituted aromatic compounds which may be used as aromatic gassing inhibitors in dimethylpolysiloxane fluids in accordance with the invention.

TABLE I

*Aromatic Gassing Inhibitors* o-Diisopropylbenzene
m-Diisopropylbenzene
p-Diisopropylbenzene
1,2,4-triisopropylbenzene
1,2,4,5-tetraisopropylbenzene
1,4-diisopropylnaphthalene
Phenylcyclopentane
Phenylcyclohexane
p-Di-(cyclohexyl)benzene
4-cyclohexylbiphenyl
4,4'-di-(cyclohexyl)biphenyl
1,4-diphenylcyclohexane
α-Cyclohexylnaphthalene
9-cyclohexylanthracene
t-Butylbenzene
t-Amylbenzene
t-Butylbiphenyl
2,2-diphenylpropane
1,4-di-(t-butyl)benzene
β-(t-Butyl)naphthalene
1-(t-butyl)anthracene
9-(t-butyl)anthracene
Hexaphenylethane
1,1,1-triphenylethane
β-(Triphenylmethyl)naphthalene
9-triphenylmethylanthracene
1-phenyl-1,1-di-(cyclohexyl)ethane Theoretically, the concentration of the gassing inhibitor added to the fluid is dependent upon the extent to which homolytic scission of the C—H bonds in the dimethylpolysiloxane molecules is expected to occur over the operating life of the cable, which, in turn, is dependent upon the maximum electrical stress which is expected to be produced during peak loads. Generally, the higher the intended operating voltages, the greater will be the expected formation of gaseous hydrogen in the cable fluid. In practice, a large excess of the gassing inhibitor is used in the cable fluid. This excess may be from twofold to as high as a hundredfold over the amount theoretically required to react with hydrogen radicals which will form over the life of the cable. Consequently, these gassing inhibitors may be used over a very wide range of concentrations. For most high voltage cables, we prefer to use the gassing inhibitor compounds in an amount in the range from about 0.5 to about 20 or even 25 percent by weight of the cable fluid.

To illustrate the applicability of impregnating the polyethylene insulation of a high voltage power cable with a fluid organosilicon polymer containing an anti-gassing agent in accordance with the invention, a preferred embodiment is described below with reference to the single FIGURE on the accompanying drawing:

The cable shown in this figure, which is a fragmentary perspective view partly broken away, is a single conductor cable having a central stranded conductor 1 surrounded throughout its entire length by a semiconducting layer 2 of porous polyethylene in which carbon-black is dispersed. Both the conductor 1 and the semiconducting layer 2 surrounding it are covered by a substantially continuous concentric insulating layer 3 which is composed of many layers of a helically-wrapped polyethylene tape saturated with a dimethylpolysiloxane liquid having a viscosity, at 25° C., in the range from 0.6 to 30,000 centistokes and a dielectric constant in the range from 2.2 to 2.8 and in which there is dissolved a minor amount of a phenylmethylpolysiloxane.

The polyethylene tape which is used to form the concentric insulating layer 3 is freely permeable, and preferably formed from a thin, flexible sheet composed of minute, substantially discrete but coherent particles of polyethylene. The insulating layer 3 is shielded, in turn, by an outer semiconducting layer 4 of porous polyethylene tape containing carbon-black.

The polysiloxane fluid containing the anti-gassing agent is impregnated into the insulating layer by immersing the wrapped conductor in a bath of the polysiloxane in a vessel in which it can alternately be evacuated and then subjected to pressure to withdraw air and to cause the liquid to fill all voids and interstices in the porous wrapping. Thereafter a protective lead sheath 5 is extruded about the polysiloxane-impregnated wrapping throughout substantially the entire length of the cable.

To further illustrate the effectiveness of incorporating either a phenyl-substituted polysiloxane or a ring-substituted aromatic compound possessing one or more tertiary substituents in a dimethylpolysiloxane fluid in accordance with the invention, Table II summarizes the gassing coefficients obtained when a dimethylpolysiloxane fluid having a viscosity, at 25° C. of 10 centistokes was subjected to electrical stress in a test cell containing an atmosphere of hydrogen gas, the gassing coefficient being defined as the number of cubic centimeters of gas evolved (+) or absorbed (−) in 100 minutes at a temperature of 82.5° C., using an applied potential of 9 kilovolts at 60 cycles per second.

TABLE II

*Effect of Various Aromatic Compounds on the Gassing Coefficient of Dimethylpolysiloxane Fluids*

| Additive | Conc. (Percent) | Gassing Coefficient |
|---|---|---|
| None | | +0.3 |
| Phenylmethylpolysiloxane in dimethylpolysiloxane having 5 cs. viscosity | 25 | −2.8 |
| Do | 33 | −3.0 |
| Phenylmethylpolysiloxane | 5 | −2.0 |
| t-Butylnaphthalene | 10 | −5.1 |

Examination of the experimental results tabulated in Table II demonstrates the marked advantage of incorporating these gassing inhibitors in dimethylpolysiloxane fluid dielectrics. Cables impregnated with fluids containing these gassing inhibitors may be operated at very high voltages for prolonged periods of time without suffering serious deterioration of the dielectric properties.

Although the foregoing examples demonstrate the marked advantages in incorporating various gassing inhibitors in dimethylpolysiloxane cable fluids, similar advantages are also obtained when the gassing inhibitor is employed in the fluid organosilicon polymer dielectrics of other types of high voltage electrical apparatus, such as transformers, circuit breakers, capacitors, and bushings. For example, by incorporating a phenyl-substituted polysiloxane or a tert-butyl-substituted aromatic compound (such as a t-butylanthracene) in the silicone fluid insulation surrounding the metallic conductors in a transformer, it is possible to impart a negative gassing coefficient to the fluid and to minimize any increase in the power factor of the organosilicon polymer during operation of the transformer at very high voltages. Consequently, the invention is applicable to the use of these aromatic gassing inhibitors in any type of high voltage electrical apparatus in which metallic conductors are surrounded by fluid organosilicon polymer insulation.

We claim:

1. In high voltage electrical apparatus in which metallic conductors are surrounded by insulation comprising a fluid organosilicon polymer, the improvement which comprises incorporating in the fluid a gassing inhibitor selected from the group consisting of sec-alkyl-substituted aromatic hydrocarbon compounds having a boiling point, at atmospheric pressure, of not less than 200° C., and ring-substituted aromatic hydrocarbon compounds having a structure represented by the formula

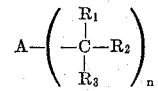

in which A is an aromatic hydrocarbon nucleus, $R_1$, $R_2$, and $R_3$ are substituents selected from the group consisting of alkyl, cycloalkyl, and aryl radicals, and $n$ is an integer from 1 to 6, thereby imparting a negative gassing coefficient to the fluid.

2. In high voltage electrical apparatus in which metallic conductors are surrounded by insulation comprising a dimethylpolysiloxane fluid, the improvement which comprises incorporating in the fluid a sec-alkyl-substituted aromatic hydrocarbon compound having a boiling point, at atmospheric pressure, of not less than 200° C., thereby imparting a negative gassing coefficient to the fluid.

3. In high voltage electrical apparatus in which metallic conductors are surrounded by insulation comprising a dimethylpolysiloxane fluid, the improvement which comprises incorporating in the fluid a ring-substituted aromatic hydrocarbon compound having a structure represented by the formula

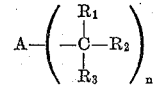

in which A is an aromatic hydrocarbon nucleus, $R_1$, $R_2$, and $R_3$ are substituents selected from the group consisting of alkyl, cycloalkyl, and aryl radicals, and $n$ is an integer from 1 to 6, thereby imparting a negative gassing coefficient to the fluid.

4. A high voltage electric power cable comprising a copper conductor surrounded by insulation impregnated with a dimethylpolysiloxane fluid having a viscosity, at 25° C., from 0.6 to 30,000 centistokes and a dielectric constant from about 2.2 to about 2.8 and in which there is dissolved a minor amount of a gassing inhibitor of the group consisting of sec-alkyl-substituted aromatic hydrocarbon compounds having a boiling point, at atmospheric pressure, of not less than 200° C., and ring-substituted aromatic hydrocarbon compounds having a structure represented by the formula

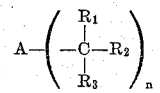

in which A is an aromatic hydrocarbon nucleus, $R_1$, $R_2$ and $R_3$ are substituents selected from the group consisting of alkyl, cycloalkyl, and aryl radicals, and $n$ is an integer from 1 to 6, whereby a negative gassing coefficient is imparted to the fluid.

5. A high voltage electric power cable comprising a copper conductor surrounded by insulation impregnated with a dimethylpolysiloxane fluid having a viscosity, at 25° C., from 0.6 to 30,000 centistokes and a dielectric constant from about 2.2 to about 2.8 and in which there is dissolved a minor amount of a sec-alkyl-substituted aromatic hydrocarbon compound having a boiling point, at atmospheric pressure, of not less than 200° C. and selected from the group consisting of diisopropylbenzene, triisopropylbenzene, tetraisopropylbenzene, and phenylcyclohexane, whereby a negative gassing coefficient is imparted to the fluid.

6. A high voltage electric power cable comprising a copper conductor surrounded by insulation impregnated with a dimethylpolysiloxane fluid having a viscosity, at 25° C., from 0.6 to 30,000 centistokes and a dielectric constant from about 2.2 to about 2.8 and in which there is dissolved a minor amount of a ring-substituted aromatic hydrocarbon compound having a structure represented by the formula

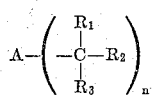

in which A is an aromatic hydrocarbon nucleus, $R_1$, $R_2$, and $R_3$ are substituents selected from the group consisting of alkyl, cycloalkyl, and aryl radicals, and $n$ is an integer from 1 to 6, whereby a negative gassing coefficient is imparted to the fluid.

7. A high voltage electric power cable comprising a copper conductor surrounded by insulation impregnated with a dimethylpolysiloxane fluid having a viscosity, at 25° C., from 0.6 to 30,000 centistokes and a dielectric constant from about 2.2 to about 2.8 and in which there is dissolved a minor amount of a t-butyl-substituted aromatic hydrocarbon compound, whereby a negative gassing coefficient is imparted to the fluid.

8. A high voltage electric power cable comprising a metallic conductor surrounded by a fluid-permeable layer of polyethylene tape helically wrapped about the conductor and a dimethylpolysiloxane fluid having a viscosity, at 25° C., from 0.6 to 30,000 centistokes and a dielectric constant from about 2.2 to about 2.8 impregnated into and filling the pores and interstices of said layer, the dimethylpolysiloxane fluid containing a minor amount of gassing inhibitor selected from the group consisting of sec-alkyl-substituted aromatic hydrocarbon compounds having a boiling point, at atmospheric pressure, of not less than 200° C., and ring-substituted aromatic hydrocarbon compounds having a structure represented by the formula

in which A is an aromatic hydrocarbon nucleus, $R_1$, $R_2$, and $R_3$ are substituents selected from the group consisting of alkyl, cycloalkyl, and aryl radicals, and $n$ is an integer from 1 to 6, whereby a negative gassing coefficient is imparted to the fluid.

References Cited in the file of this patent

UNITED STATES PATENTS

| | | |
|---|---|---|
| 2,238,637 | Gaylor | Apr. 15, 1941 |
| 2,377,630 | Hyde | June 5, 1945 |
| 2,377,689 | Hyde | June 5, 1945 |
| 2,436,110 | Larsen | Feb. 17, 1948 |
| 2,468,869 | Daudt | May 3, 1949 |
| 2,517,536 | Chenicek | Aug. 8, 1950 |
| 2,837,724 | Cook | June 3, 1958 |
| 2,993,156 | Robinson | July 18, 1961 |

FOREIGN PATENTS

| | | |
|---|---|---|
| 882,260 | Germany | Aug. 10, 1953 |
| 209,621 | Australia | Aug. 8, 1957 |

OTHER REFERENCES

Publication I, "Gassing of Liquid Dielectrics Under Electrical Stress," by Basseches, H., and McLean, D. A., Ind. Eng. Chem. 47, 1782–1794 (1955).